HIGH FREQUENCY PHASE-SYNCHRONIZED SIGNAL SYNTHESIZER
Filed Nov. 30, 1965
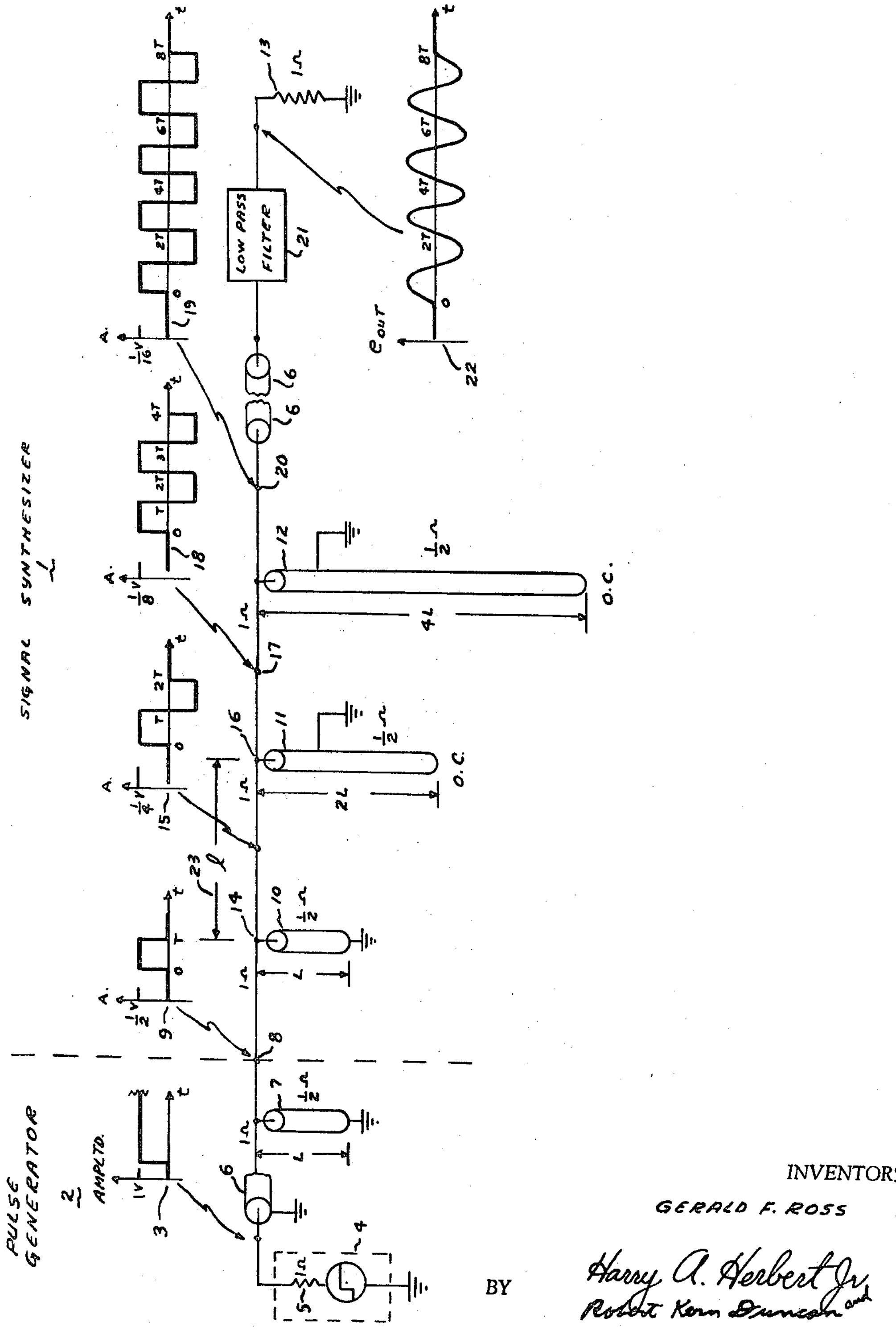
INVENTORS
GERALD F. ROSS
BY
Harry A. Herbert Jr.
Robert Kern Duncan and
ATTORNEYS United States Patent Office 3,418,604
Patented Dec. 24, 1968

3,418,604
HIGH FREQUENCY PHASE-SYNCHRONIZED SIGNAL SYNTHESIZER

Gerald F. Ross, Lexington, Mass., assignor to the United States of America as represented by the Secretary of the Air Force Filed Nov. 30, 1965, Ser. No. 510,718
2 Claims. (Cl. 333—20)

ABSTRACT OF THE DISCLOSURE

A full wave pulse of energy is generated in a transmission line, terminated in its characteristic impedance, from a half-wave pulse of energy propagating in the transmission line by connecting to the line a reflective stub element having one-half the characteristic impedance of the line and a length such that the transit time of the energy in the stub element is equal to the time width of the original half-cycle pulse. Additional successive doublings of the number of cycles of energy present on the transmission line is obtained by connecting to it in sequence reflective stub lines having one-half the impedance of the line and having lengths such that the transit times in the stubs are equal to the time width of the total number of cycles on the line at the respective point at which the stub is to be connected. At the doubling of the half-wave to a full wave and at each of the successive doubling of the number of waves, propagating the transmission line toward the load, the voltage magnitudes of the wave pulses on the line are necessarily reduced to one-half that of their former voltage values.

In many instances it is desirable to have a uniform wave train of high frequency energy having defined characteristics for use as a test signal in the examination of microwave components or combinations of microwave components. It is thus an object of the present invention to provide a system for generating a uniform wave train of high frequency energy having a definite number of cycles.

It is another object of the present invention to provide a system that will synthesize a defined wave train from a single excitation pulse.

It is another object of the present invention to provide a system that will generate a pulse of extremely high frequency oscillations.

It is another object of the present invention to provide a passive system network that will generate a pulse of energy having a defined series of phase-synchronized cyclic waves when excited by a half-cycle pulse of energy.

Various other objects and advantages will appear from the following description taken in connection with the single schematic drawing of one illustrative embodiment of the invention, and the novel features will be particularly pointed out hereinafter in connection with the appended claims.

Referring to the drawing, the passive system network 1 for the generation of a phase synchronized signal may be excited, or driven, by a single pulse of energy from a pulse generator. The disclosed system is particularly suitable for the generation, or synthesization, of a pulse consisting of cycles of extremely high frequency energy such as when it is driven by a very narrow pulse of energy. The pulse generator 2 as described in more detail and claimed in our application having Ser. No. 510,717 filed on Nov. 30, 1965 may be suitably used to drive the signal synthesizer.

In describing the operation of the particular embodiment shown in the figure specific unit values of voltages and impedances are set forth for illustration only. A unit step voltage pulse 3 is generated by the unit step generator 4 having a unit impedance 5 of one ohm. The unit step voltage is conducted by the coaxial cable 6 having a characteristic impedance of one ohm to the shorted stub reflective unit 7 having a characteristic impedance of ½ ohm. The pulse provided at the output 8 of the pulse generator is a pulse 9 having a pulse width approximately equal to the electrical transit time taken by the step wave traversing the length of the shorted stub to its termination and return to the coaxial line. The amplitude of the output pulse 9 is approximately one-half a volt. The pulse width T of pulse 9 in seconds is equal to $2L/C$, where L is the length of the shorted stub element 7 and C is the velocity of propagation of the electrical wave in the stub. This pulse generator is set forth in detail in the aforementioned copending application. One ohm impedance coaxial line 6 extends through the system. Suitable coaxial connectors may be used to make connections where necessary. The reflective transmission elements 7 in the pulse generator, and 10, 11 and 12 in the synthesizer all have one-half the characteristic impedance of the transmission line 6, i.e. one-half ohm. The transmission line 6, the step generator 4, and the load 13 all have the same impedance; one ohm in the illustrated embodiment.

The one-half volt pulse 9 at the output 8 of the half-cycle pulse generator is conducted by the coaxial line 6 to the junction 14 with stub 10. Stub line 10 is identical with stub line 7. When the synthesizer is driven by a different half-cycle generator the length L of the stub 10 is determined by the half-cycle pulse width driving the synthesizer such that $L=CT/2$ where, as previously defined, T is the half-cycle pulse width in seconds, L is the length of the shorted stub, and C is the velocity of propagation in the stub. When the incident pulse 9 arrives at point 14 its amplitude is reduced to ¼ volt. The reflected pulse coming from the short-circuited stub joins the ¼ volt pulse traveling on past junction 14T seconds later and is inverted in sign. The result is a single square cycle 15 of 2T duration and ¼ volt in amplitude. This square cycle travels to junction 16, where the entire cycle is transmitted to point 17 after losing half of its amplitude. The square cycle propagating in the stub 11 encounters an open circuit termination at a distance of 2L from the junction point 16. Hence, this signal reflects with the same sign and joins the wave form travelling to point 17 2T seconds later. The result 18 is two square cycles of 4T overall duration and of ⅛ volt in amplitude. By similar action when the wave 18 passes open circuit terminated reflective stub elment 12 having a length of 4L the signal 19 at point 20 consists of four square cycles having a duration 8T seconds and an amplitude of 1/16 volt. It is now apparent that any doubling of the number of square cycles of energy may be generated by the use of additional reflective elements, each additional element having a total transit time equal to the time duration of the pulse impressed upon it. The conservation of energy law applies and since no energy is added by the passive network the voltage amplitude of the signal becomes one-half its former value after each doubling of its duration.

The period of the generated pulse of phase synchronized square wave energy is 2T seconds, where T is time duration of the driving, or excitation pulse, and the fundamental frequency $f_0$ is necessarily $f_0=1/2T$ c.p.s.

In some applications of this invention it may be desirable to attenuate the higher harmonics of the generated square wave signal so as to have a signal possessing sine wave characteristics. If this is desired the square wave signal may be passed through a low pass filter 21 having a cut-off frequency of approximately $2f_0$, then the synthesized signal 22 presented to the load 13 is a signal having a defined amplitude, is a defined number of cycles in duration, and has sine wave characteristics. It is to be understood that the low pass filter will have a build-up time which will be approximately $T/2$ seconds or one-fourth of a period of the wave which, for example, for a 1000 mc. signal would be approximately one-fourth nanosecond.

It should further be understood that in the embodiment as illustrated in the figure, there will be reflections between the stub junctions due to waves travelling in the back direction that will be eventually reflected toward the output. If the line lengths between stubs, however, are made long with respect to the last studb, these undesired reflections will be far removed in time from the desired generated output pulse. For example, in an embodiment of the synthesizer for generating an eight cycle signal, the system thus having four reflective stub elements (the figure illustrates a three stub synthesizer for generating a four cycle signal) with a frequency $f_o$ equal to 1000 mc., the length of the last (longest) stub would be approximately 0.6 meter (an open terminated stub having a length of 8L). Hence, 23 the line lengths between the stubs should be, in this instance, greater than 0.6 meter in order to keep secondary reflections from distorting the desired signal. In that particular embodiment a distance of one meter between stubs would place the closest undesirable signal approximately 2.7 nanoseconds away from the desired generated signal.

Obviously many modifications and variations of the present invention are possible in light of the above teaching. While but a single illustrative embodiment has been shown, those skilled in the art will realize that the voltages, impedances, and elements set forth are merely representative. For instance, open wire transmission line may be used in place of the coaxial lines illustrated, and that the invention is not limited to a specific frequency or number of cycles of generated signal. It is therefore to be understood that within the scope of the appended claims the invention may be practiced otherwise than as specifically described.

What is claimed is:

1. The system for generating a phase-synchronized, synthesized, full cycle square wave signal from a half-cycle square wave signal having a determined source impedance, comprising:

(a) a transmission line having an input connection, an output connection, and a defined characteristic impedance approximately equal in value to the said source impedance;

(b) means for connecting the said half-cycle square wave signal to the said input connection of the transmission line;

(c) load means for utilizing the said full cycle square wave synthesized signal, having an impedance approximately equal in value to the said defined characteristic impedance of the transmission line, connected to the said output connection of the transmission line;

(d) a reflective shorted stub element having an input end, a defined characteristic impedance value of approximately one-half that of the characteristic impedance value of the transmission line, and having a length approximately equal to one-half the velocity of propagation in the stub multiplied by the time width of the said half-cycle signal; and (e) means for connecting the input end of the said reflective stub element to the said transmission line intermediate the said input connection and the said output connection of the transmission line.

2. A signal synthesizer for doubling the number of cycles of a pulse signal of defined time duration of square wave energy generated by a source having a defined source impedance, the said synthesizer comprising:

(a) a transmission line having a defined characteristic impedance equal to the said source impedance connected to the said source and having an output connection;

(b) pulse receiving load means having an impedance equal to the said source impedance connected to the said transmission line output connection;

(c) a reflective stub line element having an input end, a reflective terminated end, a characteristic impedance equal to one-half the said source impedance, and a length such that the total transit time of the said signal to be doubled in the said stub element is equal to the time duration of the said signal to be doubled; and (d) connecting means for connecting the stub line to the said transmission line intermediate the said connection to the said source and the said output connection.

References Cited

UNITED STATES PATENTS

| | | | |
|---|---|---|---|
| 2,420,302 | 5/1947 | Darlington | 307—108 XR |
| 2,461,321 | 2/1949 | Guillemin | 307—106 |
| 2,820,909 | 1/1958 | Plouffe | 307—106 |
| 2,863,072 | 12/1958 | Alexander | 307—106 |
| 3,225,223 | 12/1965 | Martin | 307—108 |

FOREIGN PATENTS

| | | |
|---|---|---|
| 716,312 | 10/1954 | Great Britain. |

HERMAN KARL SAALBACH, *Primary Examiner.*

MARVIN NUSSBAUM, *Assistant Examiner.*

U.S. Cl. X.R.

307—106; 328—56, 57